July 15, 1958     J. A. J. BENNETT     2,843,337
COMPOSITE AIRCRAFT SYSTEM, AND METHOD OF FLIGHT
Filed Sept. 29, 1953     4 Sheets-Sheet 1

INVENTOR.
JAMES A. J. BENNETT
BY
ATTORNEY

July 15, 1958  J. A. J. BENNETT  2,843,337
COMPOSITE AIRCRAFT SYSTEM, AND METHOD OF FLIGHT
Filed Sept. 29, 1953  4 Sheets-Sheet 2

INVENTOR.
JAMES A. J. BENNETT
BY Charles M. Frye
ATTORNEY

July 15, 1958  J. A. J. BENNETT  2,843,337
COMPOSITE AIRCRAFT SYSTEM, AND METHOD OF FLIGHT
Filed Sept. 29, 1953  4 Sheets-Sheet 3

INVENTOR.
JAMES A. J. BENNETT
BY
ATTORNEY

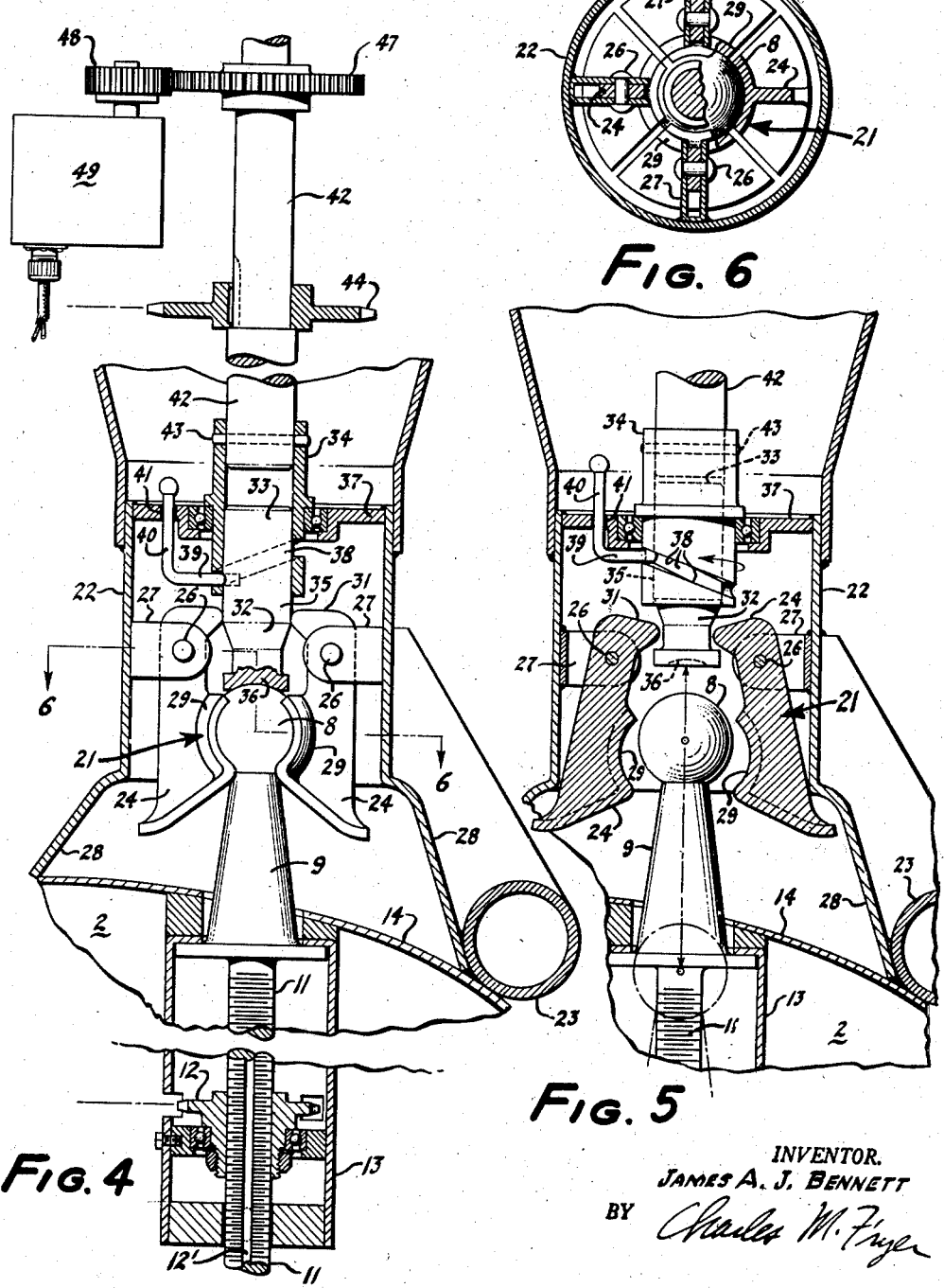

United States Patent Office 2,843,337
Patented July 15, 1958

2,843,337

COMPOSITE AIRCRAFT SYSTEM AND METHOD OF FLIGHT

James A. J. Bennett, San Mateo, Calif., assignor to Hiller Helicopters, Palo Alto, Calif., a corporation of California Application September 29, 1953, Serial No. 382,963

7 Claims. (Cl. 244—2)

This invention relates to composite aircraft; and more particularly to a system enabling fixed-wing aircraft to take-off or land substantially vertically, thereby permitting their operation from or into confined areas, for example, in the center of cities or on the deck of a ship.

Heretofore, fixed wing aircraft have had to be accelerated at take-off to a translational speed greater than the speed at which their wings stall and have had to land at a similar translational speed, thus requiring large areas from which to operate. The invention enables fixed wing aircraft to take-off or land at substantially zero translational speed, the fixed wings providing substantially no lift at the moment of take-off or touch-down.

Summarizing the invention, the system employed comprises attachment of a rotary wing aircraft, such as a helicopter (hereinafter referred to as the "tug") to strong points on and above the fixed wing aircraft in such a manner as to form a composite aircraft with rotary and fixed wing components. These components are capable of being detached at a forward speed within the speed range of each, and thereafter of being operated independently, thus enabling the fixed wing aircraft to perform its task unhindered at high speed by rotor limitations of weight and drag. Reattachment of the two components at an appropriate forward speed within their respective speed ranges allows the take-off procedure to be reversed for landing.

Such composite aircraft arrangement has the advantages which have been sought in convertible aircraft but eliminates the disadvantages associated with permanent attachment of the rotary and fixed wing systems. It combines the advantages of the airplane, viz., long range and high cruising speed, with the ability of the helicopter to land and take-off at zero speed. It performs the necessary transition from helicopter operation to independent operation of the rotary and fixed wing components smoothly and satisfactorily, and overcomes the disadvantages of the combination by separation. The combination is equally effective, and the transition to helicopter operation equally smooth when the two component aircraft are reattached.

The helicopter tug can be complementary to the fast jet-powered airplane, the take-off and landing of which has become an acute problem. The dangers of take-off and landing at high translational speeds are eliminated, and the onus of safe operation during the initial climb and final let-down are transferred from the airplane pilot to the pilot of the tug. The tug pilot performs a similar function to that of a pilot at a port for ocean-going shipping. He knows all the local hazards, and is skilled in the technique of port navigation.

It thus becomes possible for fixed-wing aircraft to operate from the deck of a merchant ship instead of from large aircraft carriers at sea, and for long-range passenger-carrying fixed wing transports to provide intercity air service from downtown to downtown. Airports with long run-ways being no longer necessary, they may be replaced by "airstops" at midtown traffic centers, and by aircraft maintenance depots at more convenient locations.

The advent of blade mounted power plants has shown that short-range helicopters can now carry a useful load well in excess of their own weight. Such a function is, in fact, an appropriate one for the ram-jet helicopter which, with its high tip speed and the weight of installed machinery at a minimum, has a better load carrying capacity for short haul purposes than other known form of helicopter with the possible exception of the rocket powered helicopter. The ram-jet helicopter is accordingly the preferred ship for the tug, although such tug may be powered by any other suitable means, but preferably jet engine power.

Preferably, the tug is attached substantially at the longitudinal center of gravity of the fixed-wing aircraft; the attachment points being close to the main structure of the fuselage. Attachment fittings on the tug are conveniently housed in the leg fairings of a skid-type undercarriage. A rigid connection may, hence, be effected directly between strong points on both upper and lower components of the composite aircraft without any appreciable penalty of weight or drag affecting the performance of either component. Moreover, the attachment fittings on the fixed-wing component are, preferably, retracted in detached flight.

The invention will now be described in further detail with reference to the accompanying drawings, which illustrate an embodiment of the invention by way of example, there being many possible variations in detail which will be obvious to those skilled in the art. In the drawings:

Fig. 4 is a fragmentary vertical section of the component connecting means taken in a plane indicated by line 4—4 in Fig. 1, illustrating an attachment ball fitting on the lower component in locked engagement with a complementary socket fitting of the upper component.

Fig. 5 is a view similar to Fig. 4, illustrating the fittings in the course of being locked or unlocked.

Fig. 6 is a horizontal section taken in planes indicated by line 6—6 in Fig. 4.

Figure 1:
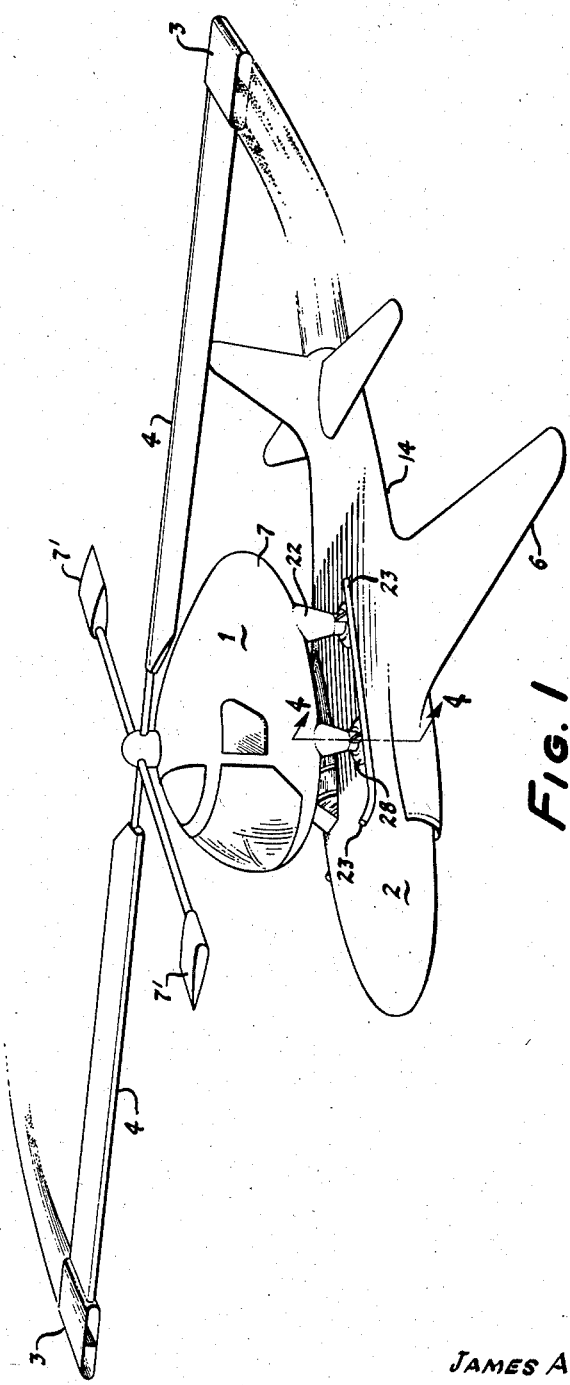
Fig. 1 is a more or less schematic isometric view of the composite aircraft in flight showing the lower fixed-wing component (a jet fighter aircraft) rigidly attached to the upper rotary-wing component (a ram jet-powered helicopter).
Figure 2:
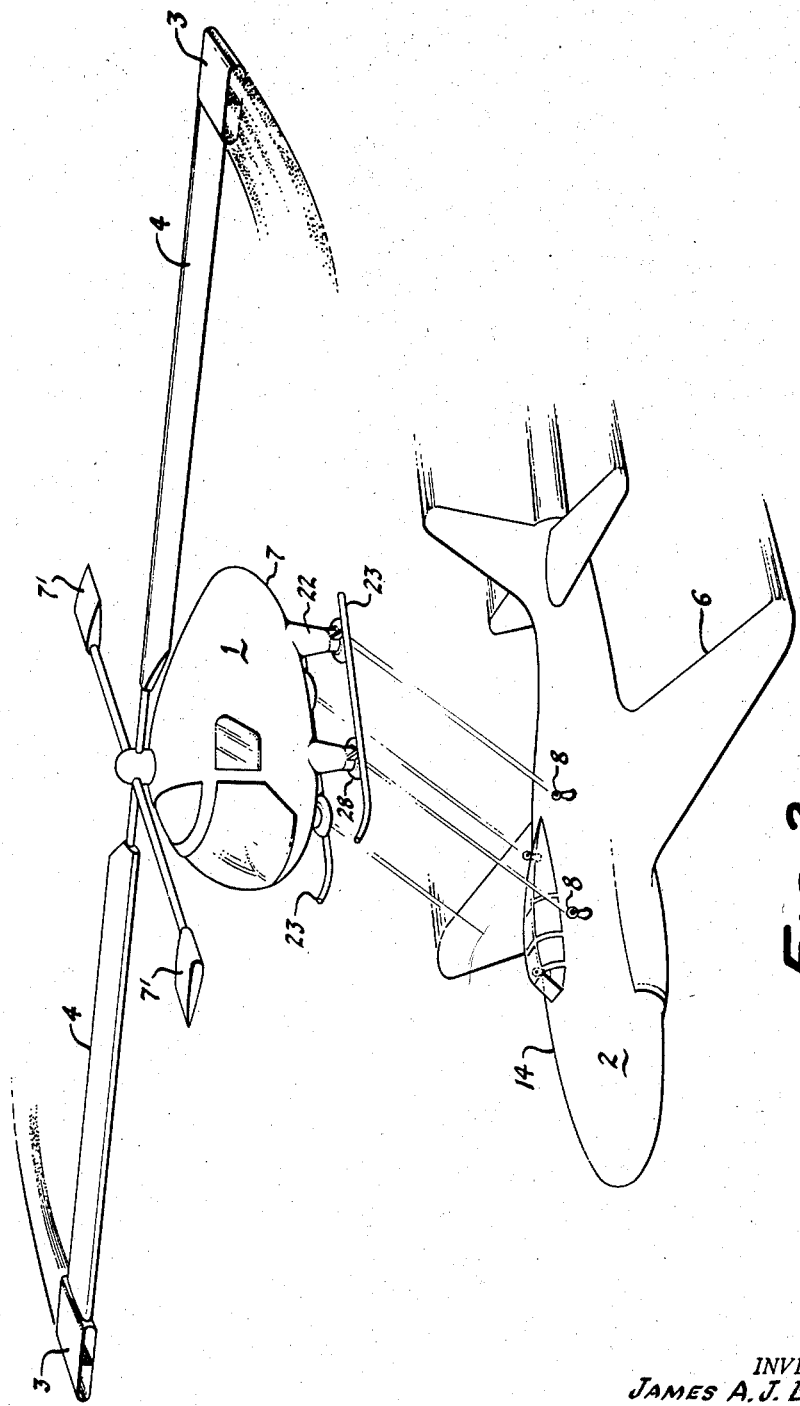
Fig. 2 is a similar view showing the two components of the composite aircraft in detached flight.
Figure 3:
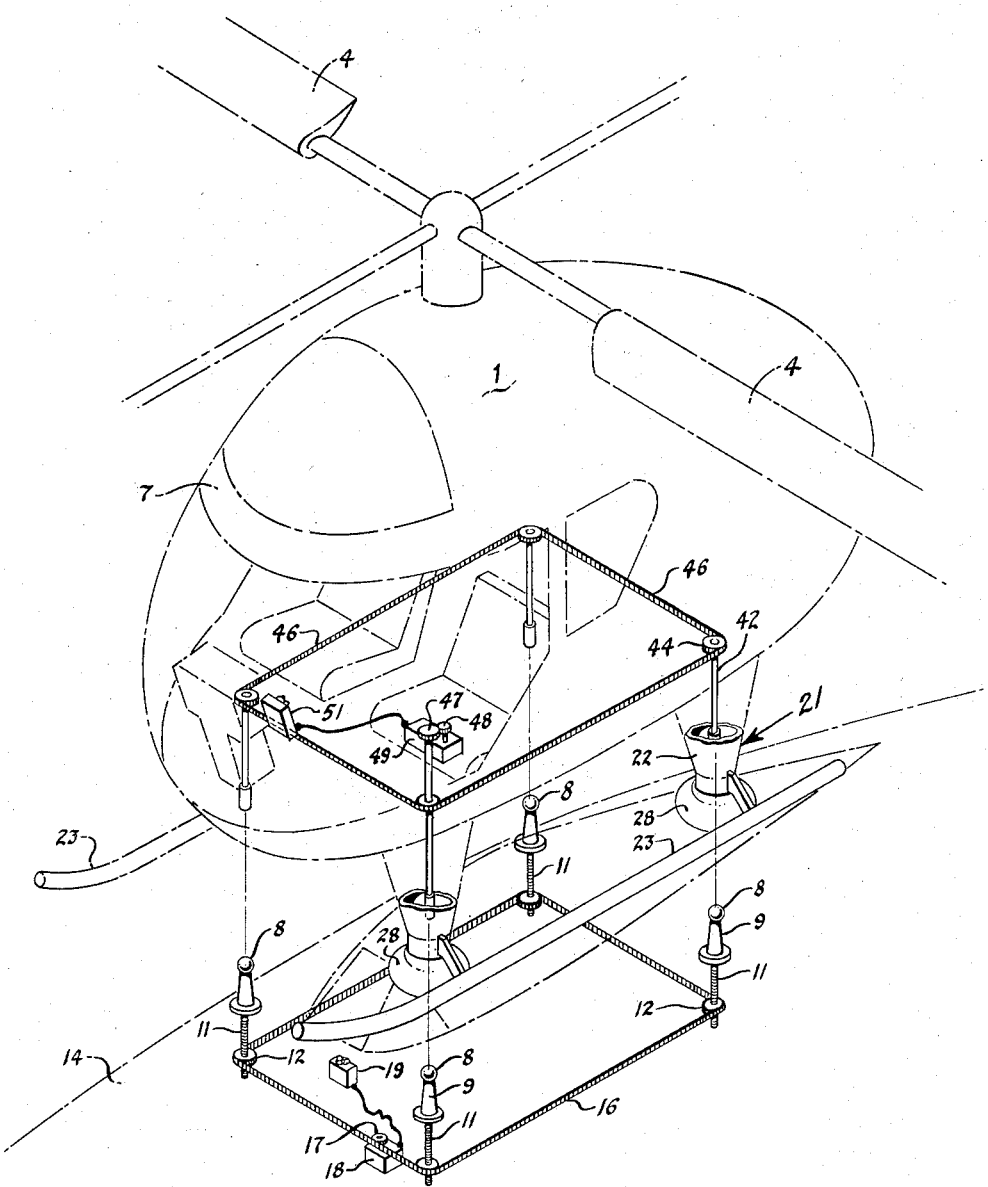
Fig. 3 is a fragmentary phantom isometric and more or less schematic view of the two components of the composite aircraft, illustrating a form of pilot controllable detachable means on the two components for rigidly connecting the components together; the view illustrating such connecting means in alinement prior to engagement.

In the system as illustrated in Fig. 1, a jet-powered helicopter 1 is fixedly connected pick-a-back to a fixed-wing aircraft 2 to form a composite aircraft with rotary and fixed-wing components. The power of ram jet engines 3 on the tips of rotor blades 4 of the helicopter is sufficient to lift the composite aircraft from the ground at substantially zero forward speed; the fixed wings 6 of the lower component 2 not making any appreciable lift contribution at take-off or prior to ground contact during landing. Upper component 1 thus functions as a tug with the composite aircraft flying as a helicopter, and the lower component as an externally-attached payload. Hence, the composite aircraft can take-off or land in confined areas; no translational speed being required for the production of lift.

Tug 1 has a relatively small and compact fuselage 7 in comparison with its rotor 4 which is pilot controlled, preferably by mechanism including control paddles 7' as disclosed in assignee's United States Patent to Hiller and Sigler No. 2,631,679, dated March 17, 1953. However, any other suitable rotor control and mounting system may be employed instead.

Fixed-wing component 2 may be of any type but is illustrated as a jet-powered fighter aircraft which, by the help of tub 1 is able to operate from the confined area of a ship's deck (not shown). The performance of the fighter is improved by employment of the tub because the tug permits a low weight undercarriage, and a high wing loading, compared with the performance of a similar fighter which is not assisted at take-off or landing in accordance with the present invention.

The means for detachably connecting the fixed wing craft 2 to tug 1 comprises a plurality, preferably four, ball members 8 at the upper ends of supports 9 fixedly secured to screws 11 threaded in sprockets 12, and slidably mounted in the sprockets by key and slot connections 12'. Sprockets 12 are journalled for rotation but held against axial movement in housings 13 fixedly supported by the framework of fuselage 14 of fixed-wing aircraft 2, at substantially the longitudinal center of gravity. Sprockets 12 are interconnected by means of an endless chain 16 engaging sprocket 17 driven by electric motor 18 which is controlled by the pilot of the fixed-wing aircraft through controller 19. By driving chain 16, balls 8 may be raised or lowered, depending upon the direction of movement of the chain, at the will of the fixed wing aircraft pilot. When attachment to the tug is to be effected, the balls are raised by the pilot; and after release between the tug and the fixed-wing aircraft, these balls are lowered by the pilot to offer minimum frictional drag.

Cooperable with each of balls 8 is a releasable socket structure 21 mounted at the lower extremity of a hollow leg 22 forming part of the tug's skid type undercarriage including skids 23 attached to legs 22. Each socket structure comprises a plurality of levers 24, each of which is pivotally mounted at 26 adjacent its upper end, on lugs 27 fixedly secured to the wall of leg 22; the lower end of each leg 22 being formed with a funnel shaped housing part 28 to guide each ball 8 into the complementary socket structure when connection of the composite aircraft is effected.

Adjacent its lower end, each lever 24 is formed with a socket portion 29 having a curvature which is the portion of a sperical surface so that the socket portions, cooperable with each ball 8, can grip the ball when the lower ends of the levers 24 are moved inwardly. This arrangement provides a fixed connection between each socket structure and the cooperating ball 8 when the socket portions 29 are locked onto the ball.

Means under the control of the pilot of the tug is provided to effect locking and unlocking between the respective balls and the cooperating socket structure. For this purpose, the upper end of each lever 24 is provided with an inwardly projecting lug 31 cooperable with a cam surface 32 at the lower end of a pin 33. Pin 33 is axially movable in a sleeve 34, by means to be explained, so that when the cylindrical portion 35 above cam surface 32 is moved downwardly to engage lugs 31, levers 24 will be moved inwardly in locked engagement with a cooperating ball 8. In this connection, the lower end of each pin 33 is provided with a socket portion 36 to engage the top of a ball 8 to enhance the locking between the ball and the socket structure.

Each sleeve 34 is journalled for rotation but held against axial movement in a bracket 37 mounted in a leg 22, and is provided with an inclined slot 38 through which passes the horizontal leg 39 of an L-shaped pin 40; the vertical leg of which is axially slidable through an aperture 41 in bracket 37. Such horizontal leg 39 is fixedly connected to pin 33. As a result, when sleeve 34 is turned, pin 33 will be moved upwardly or downwardly, depending upon the direction in which the sleeve is turned.

Extending through the upper end of each sleeve 34 is a drive shaft 42 which is fixedly connected to the sleeve by a pin 43. Each of these drive shafts 42 carries a sprocket 44 interconnected by endless chain 46 so that when the chain is driven, all of drive shafts 42 can be rotated and pins 33 raised or lowered depending upon the direction of movement of the chain 46. For driving chain 46, one of shafts 42 carries a gear 47 meshing with a pinion 48 driven by electric motor 49 mounted on the helicopter tug 1 and which can be selectively driven in either direction by the pilot of the helicopter tug through controller 51.

Thus, the pilot of the helicopter tug has control of locking or unlocking the tug to the fixed wing aircraft; and in this connection, when pins 33 are raised by the tug pilot to the position shown in Fig. 5, levers 24 can swing freely outwardly so as to enable balls 8 to be quickly separated from their cooperating socket structures 21. Also, as illustrated in Fig. 4, when pins 33 are extended downwardly to engage the tops of balls 8, the fixed-wing aircraft 2 remains firmly locked to the helicopter tug.

From the preceding description, it is seen that the problem of landing or take-off in confined areas of fixed-wing aircraft is solved by forming a composite aircraft of which the lower component is a fixed wing aircraft, and the upper component a helicopter. The composite aircraft can be safely taken off vertically from such confined area with the fixed wings making substantially no contribution to lift, and can be flown as a helicopter with the fixed wings gradually unloading the rotor as the forward speed is increased until substantially the whole weight of the lower component is supported by the fixed-wings and only the weight of the tug supported by the rotor. When this occurs, the two components can safely be detached and thereafter be operated independently, there being no appreciable discontinuity of lift or drag on either the tug or the airplane at the moment of separation.

Re-attachment of the same two components can safely be accomplished at a forward speed within the speed range of each component, thereby allowing the take-off procedure to be reversed in principle for landing, so that substantially the entire load of the composite aircraft is borne by the helicopter at touch-down. There is no appreciable discontinuity of lift or drag during the transition to helicopter operation when the two composite aircraft are re-attached. Furthermore, the same tug can be utilized to lift or land many similar fixed-wing aircraft equipped with cooperable detachable connecting means to form the composite aircraft. Also, the same fixed-wing aircraft can be lifted or landed by similar helicopters, thus making for a very flexible system.

The problems of release and re-attachment in flight are comparable with those already solved for the refuelling of airplanes from tankers in flight; and the technique of transporting heavy underslung masses by helicopter has already proved most successful. The principle of gradually transferring a large part of the total lift in a helicopter from the rotor, to fixed-wings as the forward speed increases and of reversing this gradual distribution of lift as the forward speed decreases is well known, but hitherto the fixed-wings and rotor have been inseparable in flight and have not been capable of independent operation as are the components of the composite aircraft system of this invention.

It is mainly in vertical flight that the tug is responsible fully for the power required by the combination. Even before the fixed wings have attained sufficient forward speed to make an appreciable contribution to lift, propulsion of the combination is mainly the responsibility of the airplane and not of the tug. The gyrodyne principle of propulsion independent of the attitude of the tip-path plane, having already been shown to be advantageous in extending the speed range of helicopters, is applied throughout the translational flight of the composite aircraft. With the tip-path plane substantially level, less power is required from the tug as the forward speed increases; and eventually the composite aircraft is powered mainly by the propulsion system of the airplane when parasite drag is responsible for the greater part of the power absorbed.

Intercommunication between the pilots corresponds to that between the bridge and engine room of a ship. The pilot of the tug is preferably in control of the composite aircraft throughout the transition from take-off to release; and his instructions will be fulfilled by the pilot of the airplane. The technique of release is preferably similar to that between a glider and its towplane, the tug pilot operating the release gear. The tug pilot is responsible for the combined aircraft when formating on the fixed-wing aircraft prior to re-attachment. The high degree of maneuverability of the helicopter; and the precision with which it can be controlled facilitate the flight operation of re-attachment.

With both components flying at forward speeds under conditions of adequate control and minimum interference, the operation is less difficult than that of landing a helicopter on the deck of a ship in moderate sea conditions. The rotor being lightly loaded before and after attachment of the fixed wing component, the periodic blade-tip stall which limits the maximum speed of helicopters is minimized; and the downwash from the rotor is small enough to affect but little the trim of either component as the two components detach or formate prior to re-attachment.

With tug assistance for the take-off and landing of the fixed-wing aircraft, it is possible to dispense with a shock-absorbing undercarriage, thus effecting a valuable saving of weight and improving the performance of such aircraft. This is an important consideration in the design of fighter airplanes. The composite machine preferably has sufficient kinetic energy to enable it to touch-down at substantially zero sinking speed with one engine inoperative. A jet-powered rotor with multi-jet blades has indeed the required double feature of multi-engine reliability and high rotational energy. Moreover, the fixed wing aircraft's propulsive system can supply translational energy to enable level flight to be maintained, with one of the tug's engines inoperative, until a landing is made.

As the fixed wings of airplanes are presently designed to compromise between the cruising and slow speed conditions of flight, the wings are generally larger than required for operation at high speed. With the responsibility of landing and take-off transferred to the helicopter tug, the wing loading of the airplane may be increased; and the high speed performance of the airplane improved. The limit of this procedure is the maximum speed of the tug. However, with speeds of over 200 knots foreseen for "gyrodyne" aircraft (helicopters with independent systems for lift and propulsion), a considerable reduction in wing area is possible for composite aircraft with rotary and fixed-wing components.

Compared with its relative large rotor, the fuselage of the tug is preferably small and compact. This results from the fact that the main payload (the fixed-wing component) is attached externally; and, as the rotor of a jet-powered helicopter is substantially torqueless, no tail rotor or other torque-balance device is required at a location remote from the hub axis.

I claim:

1. A rotary wing aircraft tug in which rotor blades provide substantially the sole airfoil lift means and having an undercarriage including a plurality of hollow legs each including a funnel shaped housing at its lower end, and mechanism for detachable connection of said rotary wing aircraft to a fixed wing aircraft to provide a composite aircraft capable of operation as a rotary wing aircraft, said mechanism including pilot controlled movable but rigid and lockable connecting members located in said legs adjacent said housings whereby rigid attachment members on a fixed wing aircraft can be guided by said funnel shaped housings into locking engagement with said lockable connecting members.

2. The method of operating a rotary wing aircraft as a tug for landing a fixed wing aircraft which comprises forming a composite aircraft by attaching said rotary wing aircraft tug to a fixed wing aircraft in flight at a forward speed such that substantially the entire weight of the fixed wing aircraft is supported by the fixed wings, gradually decreasing the forward speed of the composite aircraft until substantially its entire weight is borne by the lift of the rotary wing aircraft tug, and landing the composite aircraft including the fixed wing aircraft by the lift of the rotary wing aircraft tug.

3. The method of operating a rotary wing aircraft as a tug which comprises attaching the rotary wing aircraft to a fixed wing aircraft to form a composite aircraft, raising said composite aircraft by lift of said rotary wing aircraft, releasing said fixed wing aircraft from said rotary wing aircraft for independent flight, attaching said rotary wing tug to a fixed wing aircraft in flight to form a composite aircraft, and landing said composite aircraft including the fixed wing aircraft by lift of said rotary wing tug.

4. A rotary wing aircraft tug in which rotor blades provide substantially the sole airfoil lift means and having on its underside a support terminating in a funnel shaped housing at its lower end, and mechanism providing a fixed but detachable connection of said rotary wing aircraft to a fixed wing aircraft in flight to form a composite aircraft capable of operation as a rotary wing aircraft, said mechanism including pilot controlled movable but rigid and lockable connecting members located adjacent said funnel shaped housing whereby a rigid attachment member on such fixed wing aircraft can be guided by said funnel shaped housing into locking engagement with said lockable connecting members.

5. A rotary wing aircraft tug in which rotor blades provide substantially the sole airfoil lift means and having on its underside a funnel shaped housing to provide guide means for guiding entrance of an upwardly projecting rigid attaching member on a fixed wing aircraft in flight, a plurality of rigid connecting members movably supported on said rotary wing aircraft adjacent said funnel shaped housing for locking to said attaching member of the fixed wing aircraft when it is guided into said funnel shaped part, and means controllable by the pilot of said rotary wing aircraft for locking or unlocking said connecting members.

6. The rotary wing aircraft tug of claim 5 in which the rotor blades are jet powered.

7. The rotary wing aircraft tug of claim 5 in which the connecting members on the rotary wing aircraft are of the socket type adapted to lock with a ball member on the attaching member of the fixed wing aircraft.

References Cited in the file of this patent

UNITED STATES PATENTS

| | | |
|---|---|---|
| 1,792,738 | Hall | Feb. 17, 1931 |
| 2,366,321 | Ferro | Jan. 2, 1945 |
| 2,371,687 | Gerhardt | Mar. 20, 1945 |
| 2,472,917 | Nicolaeff | June 14, 1949 |

FOREIGN PATENTS

| | | |
|---|---|---|
| 1,002,315 | France | Oct. 31, 1951 |